US011032033B2

United States Patent
Lee et al.

(10) Patent No.: US 11,032,033 B2
(45) Date of Patent: Jun. 8, 2021

(54) METHOD AND DEVICE FOR PERFORMING COMMUNICATION BY USING ORTHOGONAL OR NON-ORTHOGONAL CODE MULTIPLE ACCESS TECHNIQUE IN WIRELESS COMMUNICATION SYSTEM

(71) Applicant: LG Electronics Inc., Seoul (KR)

(72) Inventors: Hojae Lee, Seoul (KR); Sangrim Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 16/611,705

(22) PCT Filed: Jun. 7, 2018

(86) PCT No.: PCT/KR2018/006438
§ 371 (c)(1),
(2) Date: Nov. 7, 2019

(87) PCT Pub. No.: WO2018/236078
PCT Pub. Date: Dec. 27, 2018

(65) Prior Publication Data
US 2020/0106574 A1   Apr. 2, 2020

Related U.S. Application Data

(60) Provisional application No. 62/521,538, filed on Sep. 19, 2017.

(51) Int. Cl.
*H04L 5/00* (2006.01)
*H04B 7/0456* (2017.01)
(Continued)

(52) U.S. Cl.
CPC .......... *H04L 5/0005* (2013.01); *H04B 7/0478* (2013.01); *H04L 1/0003* (2013.01); *H04L 27/2634* (2013.01)

(58) Field of Classification Search
CPC ... H04L 5/0001; H04L 5/0005; H04L 1/0002; H04L 1/0003; H04L 27/2634;
(Continued)

(56) References Cited

U.S. PATENT DOCUMENTS 8,116,220 B2    2/2012  Kim et al.
2015/0043540 A1*  2/2015  Nikopour .............. H04L 5/0007
                                                     370/335
(Continued)

FOREIGN PATENT DOCUMENTS

KR    1020110084467    7/2011
KR      101532821      6/2015
(Continued)

OTHER PUBLICATIONS

International Search Report from PCT/KR2018/006438, dated Sep. 6, 2018.

*Primary Examiner* — Kevin D Mew
(74) *Attorney, Agent, or Firm* — Dentons US LLP

(57) ABSTRACT

Provided are a method and equipment for transmitting uplink data by using a non-orthogonal code multiple access technique in a wireless communication system. Particularly, a terminal receives, from a base station, allocation information on physical resource blocks. The terminal acquires a spreading factor on the basis of the number of physical resource blocks included in the allocation information. The terminal determines a NoMA codebook set on the basis of the spreading factor. The terminal transmits uplink data generated on the basis of terminal-specific codewords included in the NoMA codebook set.

13 Claims, 16 Drawing Sheets

(51) Int. Cl.
*H04L 1/00* (2006.01)
*H04L 27/26* (2006.01)

(58) Field of Classification Search
CPC .... H04B 7/0456; H04B 7/046; H04B 7/0473; H04B 7/0478; H04B 7/0482
See application file for complete search history.

(56) References Cited

U.S. PATENT DOCUMENTS

| | | | |
|---|---|---|---|
| 2015/0282185 A1* | 10/2015 | Nikopour | H04L 1/0015 |
| | | | 370/329 |
| 2016/0049999 A1* | 2/2016 | Taherzadeh Boroujeni | |
| | | | H04J 13/10 |
| | | | 370/335 |
| 2016/0050039 A1* | 2/2016 | Ma | H04L 27/3416 |
| | | | 370/329 |
| 2017/0156131 A1* | 6/2017 | Kimura | H04L 5/0007 |
| 2018/0013526 A1* | 1/2018 | Bayesteh | H04L 5/0044 |
| 2018/0048349 A1* | 2/2018 | Sun | H04W 72/0466 |
| 2018/0212809 A1* | 7/2018 | Bakulin | H04B 7/0465 |
| 2018/0227069 A1* | 8/2018 | Lee | H04J 11/0023 |
| 2019/0223225 A1* | 7/2019 | Lee | H04L 25/03866 |
| 2019/0379511 A1* | 12/2019 | Xu | H04L 5/0037 |
| 2020/0187248 A1* | 6/2020 | Lee | H04B 1/713 |

FOREIGN PATENT DOCUMENTS

| | | |
|---|---|---|
| WO | 2017026700 | 2/2017 |
| WO | 2017057834 | 4/2017 |

* cited by examiner

METHOD AND DEVICE FOR PERFORMING COMMUNICATION BY USING ORTHOGONAL OR NON-ORTHOGONAL CODE MULTIPLE ACCESS TECHNIQUE IN WIRELESS COMMUNICATION SYSTEM

This application is the National Stage filing under 35 U.S.C. 371 of International Application No. PCT/KR2018/006438, filed on Jun. 7, 2018, which claims the benefit of U.S. Provisional Application No. 62/521,538 filed on Jun. 19, 2017, the contents of which are all hereby incorporated by reference herein in their entirety.

BACKGROUND

Field

The present specification relates to wireless communication, and more particularly, to a method of performing communication based on an orthogonal or non-orthogonal coded multiple access scheme, and a device using the method.

Related Art

A wireless communication system is widely deployed to provide various types of communication services, such as voice and data. An object of a wireless communication system is to enable a plurality of UEs to perform reliable communication regardless of their locations and mobility.

In general, a wireless communication system is a multiple access system capable of supporting communication with a plurality of UEs by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A requirement of a next-generation wireless communication system is to accommodate significantly explosive data traffic, to increase a dramatic increase in a transfer rate per user, to accommodate the significantly increased number of connected devices, and to support a very low end-to-end (E2E) latency and high energy efficiency. For this, there is ongoing research on various techniques such as dual connectivity, massive multiple input multiple output (MIMO), in-band full duplex, non-orthogonal multiple access (NOMA), super wideband support, device networking, or the like.

SUMMARY

Technical Objects

The present specification provides a method and apparatus for performing communication based on an orthogonal or non-orthogonal coded multiple access scheme in a wireless communication system.

Technical Solutions

The present specification proposes a method and apparatus for performing communication based on a non-orthogonal coded multiple access scheme in a wireless communication system.

The apparatus (or device) includes a transceiver transmitting and receiving radio signals and a processor being operatively connected to the transceiver.

More specifically, this embodiment assumes a wireless communication system environment using a general Non-orthogonal Multiple Access (NoMA) scheme. A general Non-orthogonal Multiple Access (NoMA) scheme may correspond to a spreading based multiple access scheme using a UE-specific codeword. Accordingly, the Non-orthogonal Multiple Access (NoMA) scheme may be proposed as a method of overlay transmitting a signal for multi-users to the same time-frequency resource.

A UE receives allocation information for a Physical Resource Block (PRB) from a base station. The allocation information for a Physical Resource Block (PRB) may include a number of physical resource blocks (PRBs) and/or a size of a Physical Resource Block (PRB).

The UE acquires a spreading factor based on the number of physical resource blocks included in the allocation information. At this point, the number of physical resource blocks and the spreading factor are tied to one another and may be pre-defined in a table. More specifically, in an environment where a transport block size (TBS) is fixed based on the pre-defined table, when a physical resource block is allocated, a value of a spreading factor that shall be used may be known.

The UE determines a NoMA codebook set based on the spreading factor. The NoMA codebook set may be known through an index value. At this point, the spreading factor and the NoMA codebook set are tied to one another and may be pre-defined in a table. Accordingly, even a NoMA codebook set according to the spreading factor may be recognized based on only the physical resource block allocation. Herein, it is assumed that the NoMA codebook set has a different codebook in accordance with the spreading factor.

According to the above-described embodiment, the information on the NoMA codebook set or the information on the TBS may be recognized based on only the information on the physical resource without performing any additional signaling. Therefore, control overhead according to signaling may be reduced.

In case a plurality of NoMA codebook sets are tied to the spreading factor or the MCS level or the number of multiple layers, the UE may further receive, from the base station, indication information including one NoMA codebook set among the plurality of NoMA codebook sets being tied to the spreading factor or the MCS level or the number of multiple layers. In this case, additional indication information may be needed in order to allow the UE to recognize an accurate index of a NoMA codebook set.

The UE transmits uplink data that is generated based on a UE specific codeword being included in the NoMA codebook set.

Additionally, in the NoMA scheme, a UE specific DFT based multiple access scheme for reducing the PAPR may be proposed. More specifically, in order to reduce the PAPR, the transmitting end (UE) may apply UE specific DFT, and the receiving end (base station) may apply UE specific IDFT.

The uplink data may be generated after the DFT is performed by the UE specific Discrete Fourier Transform (DFT) matrix. Each UE may be spread to a different UE specific DFT, and, then, Inverse Fast Fourier Transform (IFFT) may be performed via resource mapping of the spread subcarrier. Thereafter, a time domain signal is generated, which is then transmitted through a channel.

The UE specific DFT matrix may be determined based on a UE specific DFT vector and a phase vector. More specifically, the UE specific DFT matrix may be obtained by a Hadamard Product the UE specific DFT vector and the phase vector. At this point, the UE specific DFT vector may be determined based on the UE specific codeword. The phase vector may be determined based on the spreading factor.

Additionally, a UE specific Inverse Discrete Fourier Transform (IDFT) matrix allowing the receiving end to apply UE specific IDFT may correspond to a Hermitian matrix of the UE specific DFT matrix.

Additionally, the UE specific DFT matrix may be determined based on a size of the physical resource block. More specifically, the UE may determine a UE specific codeword being included in the NoMA codebook set based on the size of the physical resource block and the NoMA codebook index information. The UE specific DFT matrix or the UE specific IDFT matrix may be determined based on the UE specific codeword.

Effects

Based on the proposed method, among the information on existing (or conventional) physical resources that are to be used (number of PRBs, and so on), information on a NoMA Codeword (NoMA Codebook Set Index, NoMA Codebook Index, NoMA Codeword Index, . . . ), and so on, only the NoMA Codebook Set Index may be recognized as the information on the physical resources. Accordingly, a control overhead that is caused by signaling may be reduced.

Additionally, since the UE-specific DFT/IDFT proposed in this specification has a property of a spreading code for MUD and a property of DFT for PAPR reduction in a transmitting end at the same time, the amount of arithmetic operations in the overall system may be reduced.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), and so on. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present specification are not limited thereto.

Figure 1:
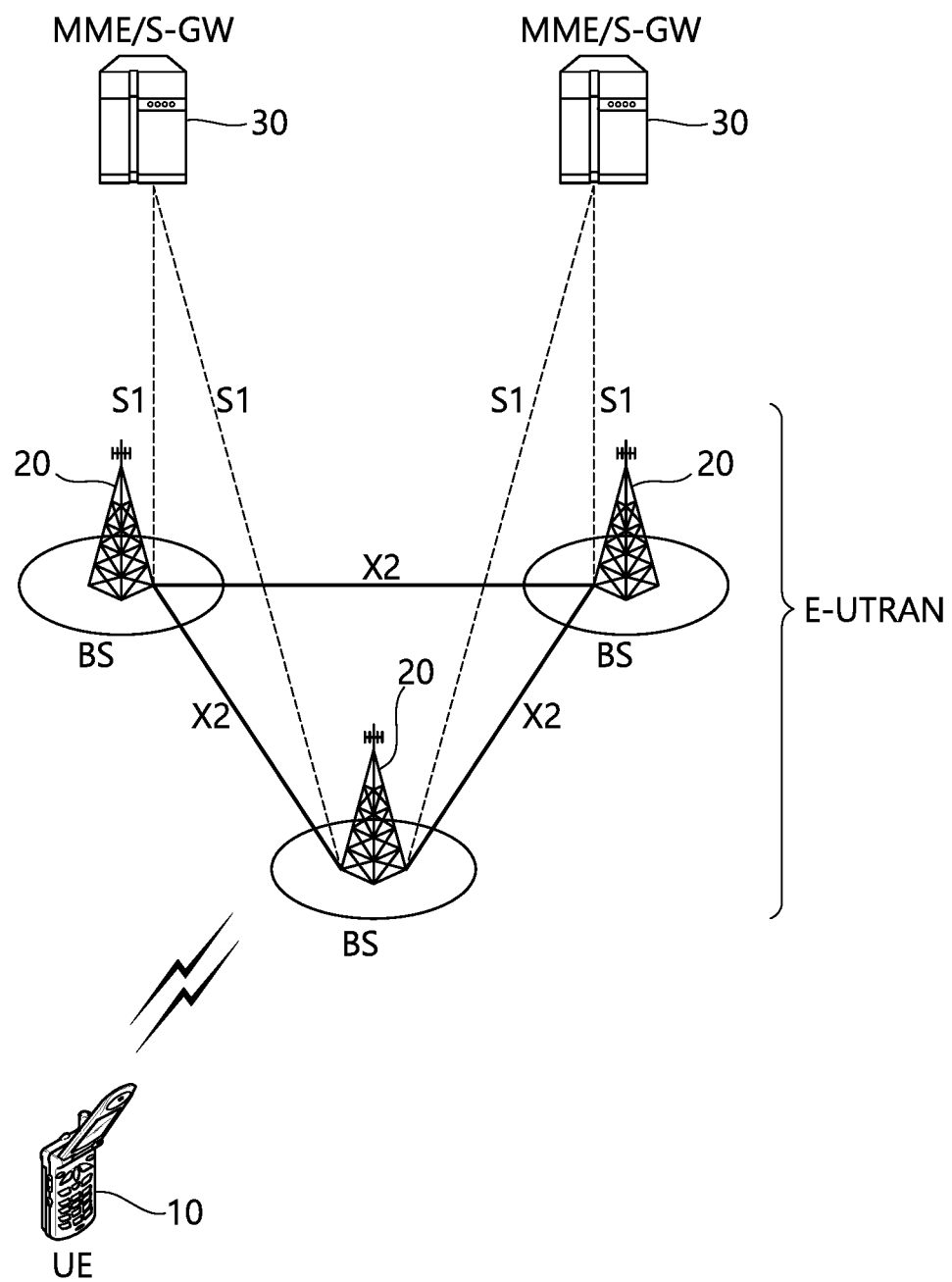
FIG. 1 shows a wireless communication system to which the present specification is applied.

FIG. 1 shows a wireless communication system to which the present specification is applied. The wireless communication system may also be referred to as an evolved-UMTS terrestrial radio access network (E-UTRAN) or a long term evolution (LTE)/LTE-A system.

The E-UTRAN includes at least one base station (BS) (20) which provides a control plane and a user plane to a user equipment (UE) (10). The UE (10) may be fixed or mobile, and may be referred to as another terminology, such as a mobile station (MS), a user terminal (UT), a subscriber station (SS), a mobile terminal (MT), a wireless device, and so on. The BS (20) is generally a fixed station that communicates with the UE (10) and may be referred to as another terminology, such as an evolved node-B (eNB), a base transceiver system (BTS), an access point, and so on.

The BSs (20) are interconnected by means of an X2 interface. The BSs (20) are also connected by means of an S1 interface to an evolved packet core (EPC) (30), more specifically, to a mobility management entity (MME) through S1-MME and to a serving gateway (S-GW) through S1-U.

The EPC (30) includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
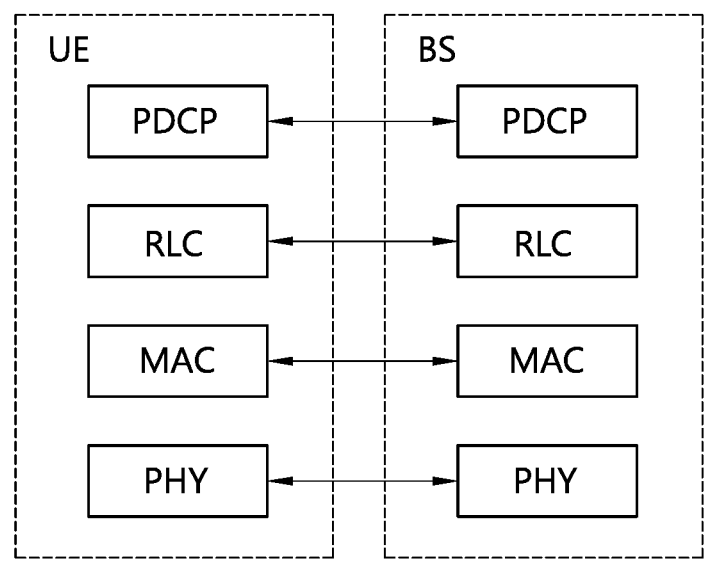
FIG. 2 is a diagram illustrating a radio protocol architecture for a user plane.
Figure 3:
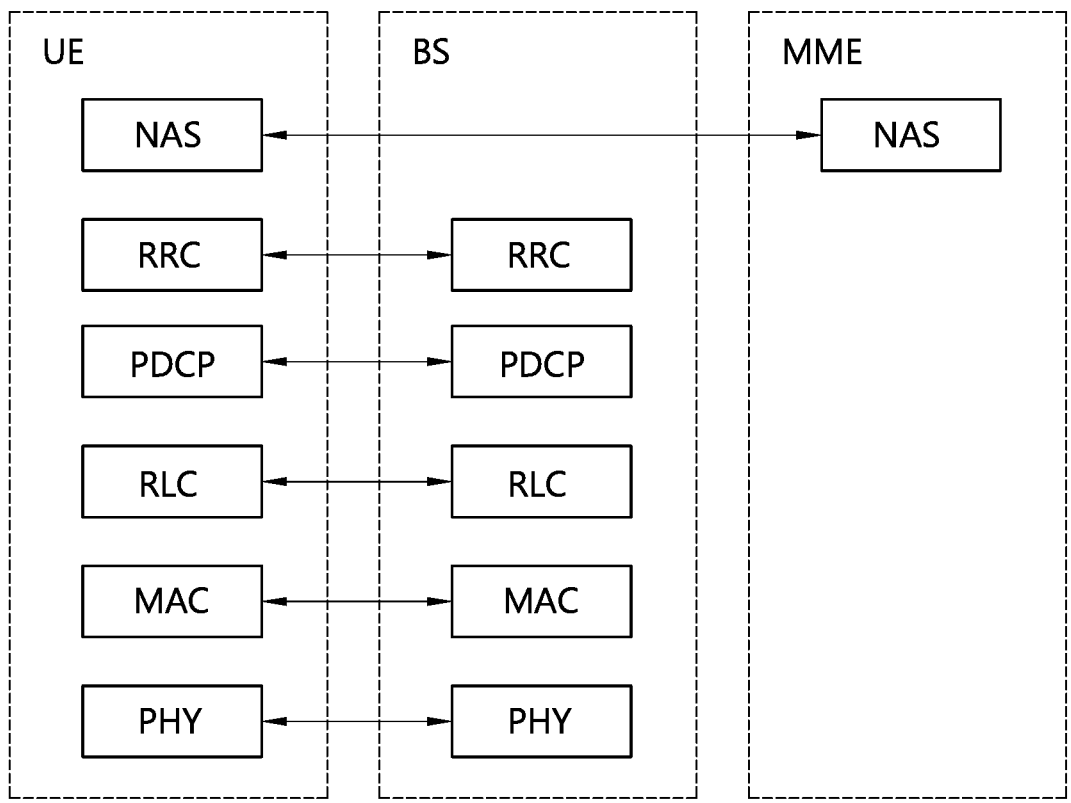
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIG. 2 and FIG. 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), and so on.

Figure 4:
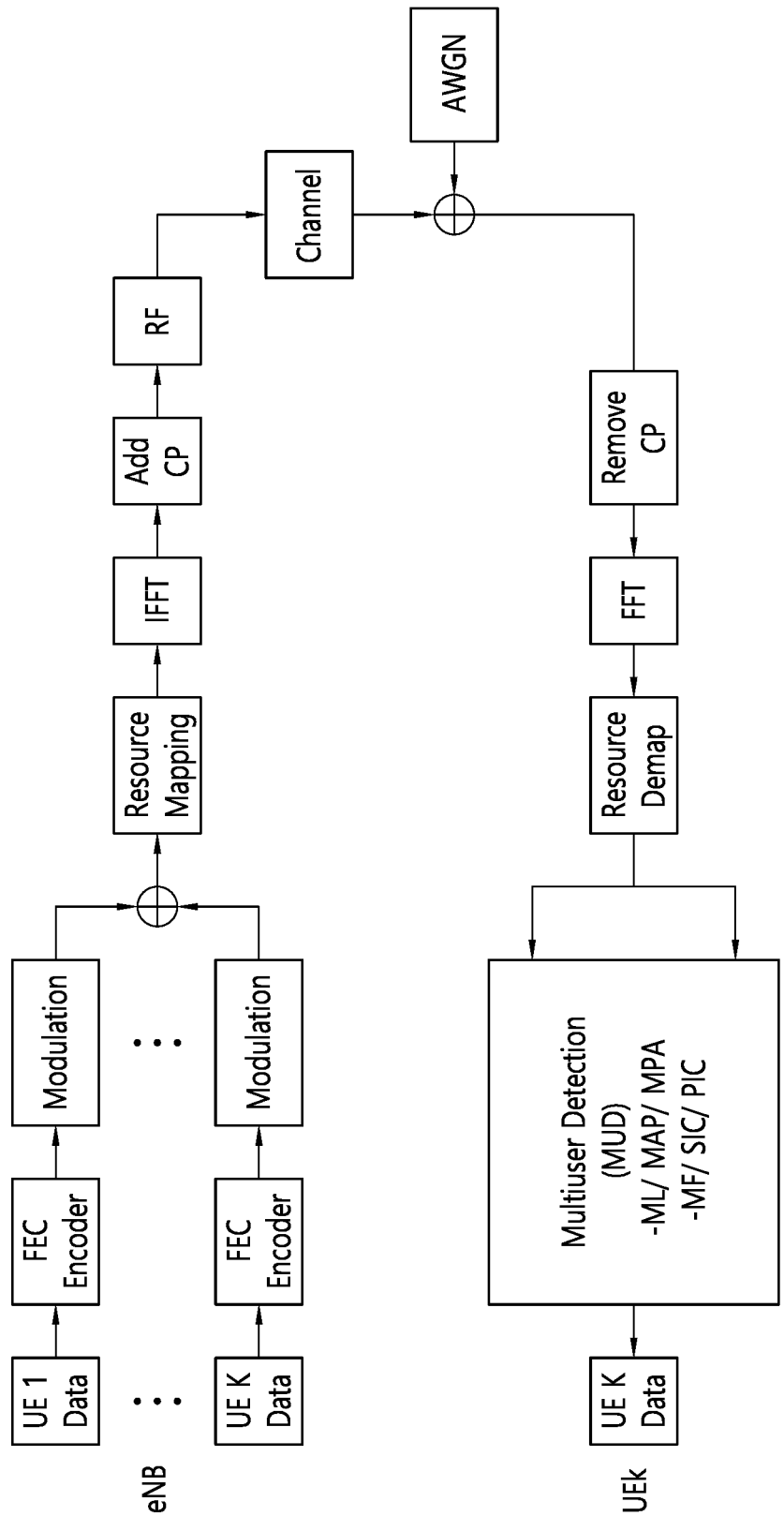
FIG. 4 is a block diagram illustrating NOMA based downlink transmission/reception (Tx/Rx) of a communication apparatus.

FIG. 4 is a block diagram illustrating NOMA based downlink transmission/reception (Tx/Rx) of a communication apparatus.

In a Non-orthogonal Coded Multiple Access (NCMA) scheme for transmitting multi-UE (or multi-user) information by allocating the multi-UE information to the same resource, a transmitter and receiver structure for downlink support as shown in FIG. 4 is general. The NOMA system may be referred to as Multiuser Superposition Transmission (MUST) in the 3GPP standardization task. The NOMA system is considered as the element technology of the next generation 5G system intended to obtain transmission capacity gain or increase the number of simultaneous accesses as compared with the LTE system by transmitting information for a plurality of UEs to the same time-frequency resource through superposition. Examples of the NOMA based technology of the next generation 5G system include MUST for identifying UEs based on a power level, Sparse Code Multiple Access (SCMA) that uses sparse complex codebook based modulation, and interleave division multiple access (IDMA) that uses a user-specific interleaver.

In case of the MUST system, the transmitter of FIG. 4 varies power allocation of each symbol after modulation of multi-UE data or transmits the multi-UE data by hierarchically modulating the multi-UE data based on hierarchical modulation, and the receiver demodulates the data of the multi-UE (hereinafter, referred to as multi-UE data) through multi-UE detection (or multiuser detection) (MUD).

In case of the SCMA system, the transmitter of FIG. 4 replaces a modulation procedure of a forward error correction (FEC) encoder and modulation procedure for multi-UE data with a sparse complex codebook modulation scheme which is previously scheduled, and the receiver demodulates the multi-UE data through MUD.

In case of the IDMA system, the transmitter of FIG. 4 modulates FEC encoding information for multi-UE data through a UE-specific interleaver, and the receiver demodulates the multi-UE data through MUD.

Each system may demodulate the multi-UE data in various MUD schemes. Examples of the various MUD schemes include Maximum Likelihood (ML), Maximum joint A posteriori Probability (MAP), Message Passing Algorithm (MPA), Matched Filtering (MF), Successive Interference Cancellation (SIC), Parallel Interference Cancellation (PIC), and Codeword Interference Cancellation (CWIC). There may be a difference in demodulation complexity and processing time delay in accordance with each demodulation scheme or each demodulation attempt.

Figure 5:
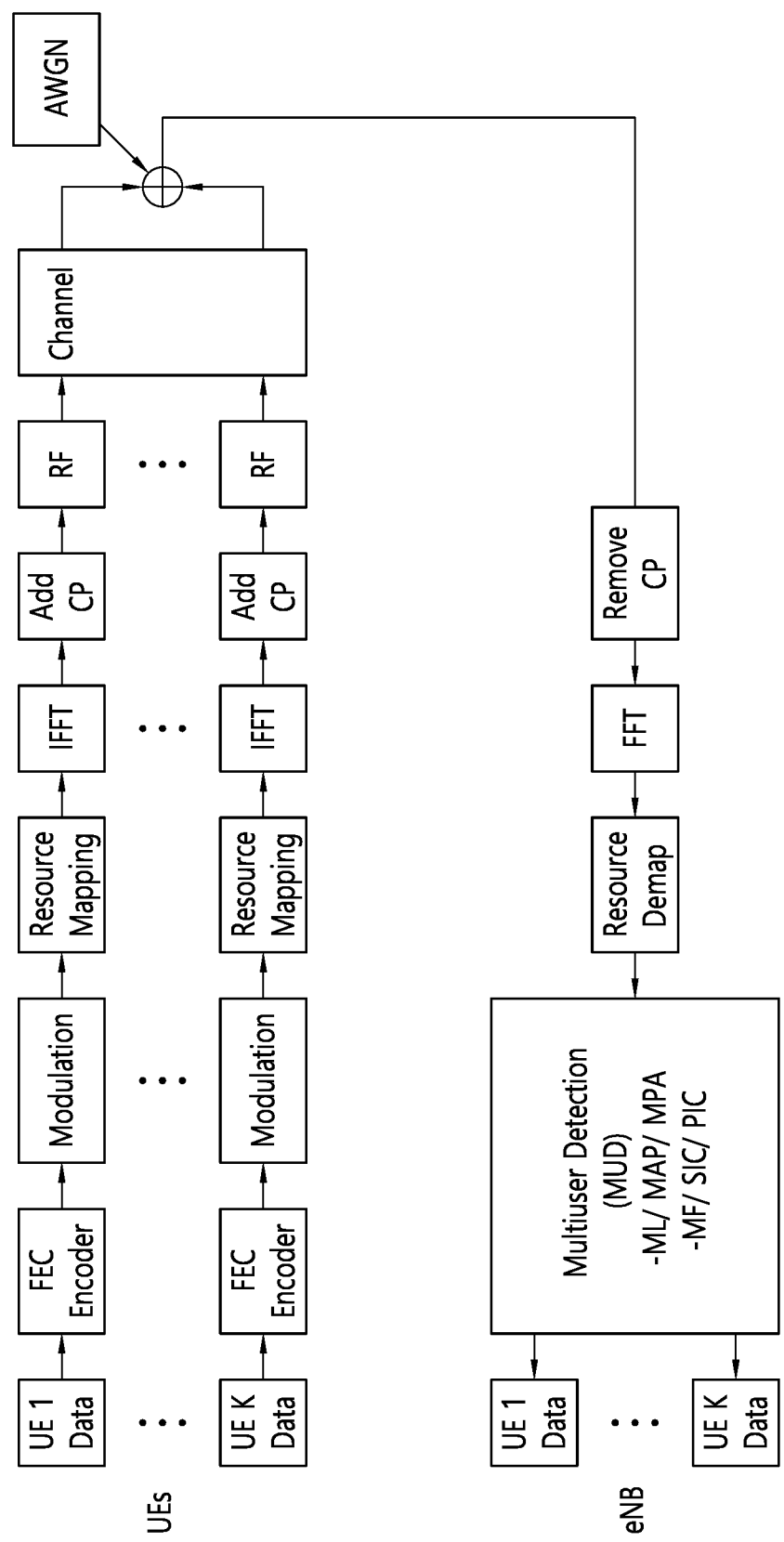
FIG. 5 is a block diagram illustrating NOMA based uplink transmission/reception (Tx/Rx) of a communication apparatus.

FIG. 5 is a block diagram illustrating NOMA based uplink transmission/reception (Tx/Rx) of a communication apparatus.

A transmitter and receiver structure for uplink support of the NOMA based system that transmits information of multi-UE (hereinafter, referred to as multi-UE information) by allocating the multi-UE information to the same resource is shown in FIG. 5. Each system may transmit multi-UE data in the same manner as the description of the downlink structure of FIG. 4 and modulate the multi-UE data through the receiver. Since the NOMA based systems transmit multi-UE signals to the same time-frequency resource through superposition, the systems have a higher decoding error rate as compared with the LTE system but may support higher frequency usage efficiency or more massive connectivity. The NOMA systems may achieve higher frequency usage efficiency or more massive connectivity while maintaining a decoding error through coding rate control in accordance with a system environment.

Since the NOMA based systems allocate data of multi-UEs to the same resource, interference of multi-UE data is necessarily generated as compared with allocation of single-UE data. A signal of the kth receiver in the NOMA based system of FIG. 4 is simply expressed as illustrated in the following Equation 1.

$$y_k = \sum_{n=1}^{K} h_k s_n + n_k = h_k s_k + \sum_{n \neq k, n=1}^{K} h_k s_n + n_k \quad \text{[Equation 1]}$$

In this case, $h_k$ means a channel from the transmitter to the kth receiver, $s_k$ means a data symbol to the kth receiver, and $n_k$ means signal noise. K is the number of multiple UEs allocated to the same time-frequency resource.

The second term $$\sum_{n \neq k, n=1}^{K} h_k s_n$$

of the third formula of the Equation 1 indicates multiuser interference (MUI) signal according to a data symbol to another receiver. Therefore, transmission capacity according to the received signal is simply expressed as illustrated in the following Equation 2.

$$C = \sum_{k=1}^{K} R_k \quad \text{[Equation 2]}$$

$$R_k = \log_2\left(1 + \frac{|h_k s_k|^2}{\left|\sum_{n \neq k, n=1}^{K} h_k s_n\right|^2 + \sigma_k}\right) =$$

$$\log_2\left(1 + \frac{\text{Channel Gain}}{MUI + \text{Noise}}\right), \forall k$$

In transmission capacity of the above Equation 2, the number of Rk added in accordance with increase of K may be increased, whereby increase of C may be expected. However, each Rk may be reduced due to increase of MUI in accordance with increase of K, entire transmission capacity C may be reduced. In accordance with the MUD scheme, even though data of each UE may be demodulated while MUI is being effectively reduced, the presence of MUI reduces entire transmission capacity and requires MUD of high complexity. If MUI occurrence of data transmission of the multi-UE is minimized, higher transmission capacity may be expected. Alternatively, if MUI occurrence for data transmission of the multi-UE may be controlled quantitatively, higher transmission capacity may be planned by scheduling of data superposition of the multi-UE.

Figure 6:
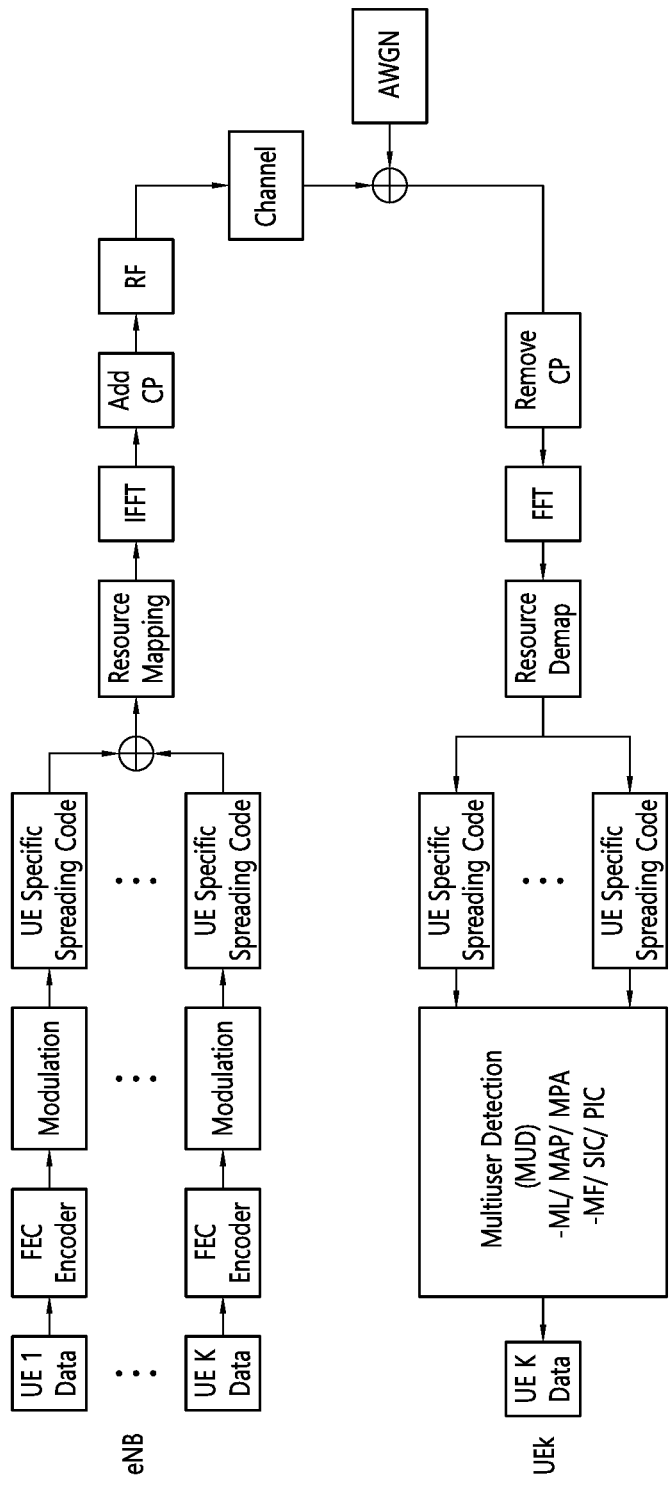
FIG. 6 shows an exemplary NOMA-based downlink transmission/reception (Tx/Rx) block diagram using a non-orthogonal spreading code of a communication device.
Figure 7:
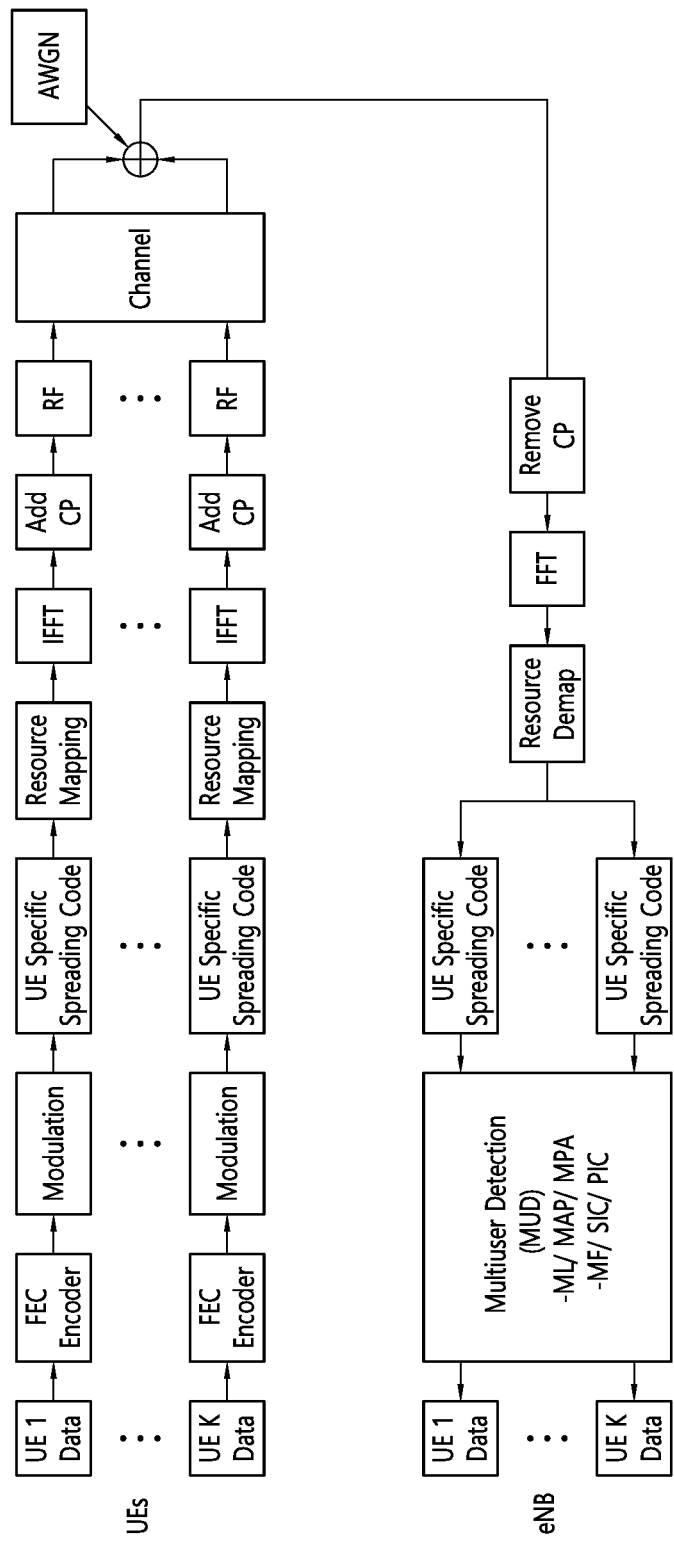
FIG. 7 shows an exemplary NOMA-based uplink transmission/reception (Tx/Rx) block diagram using a non-orthogonal spreading code of a communication device.

FIG. 6 shows an exemplary NOMA-based downlink transmission/reception (Tx/Rx) block diagram using a non-orthogonal spreading code of a communication device. And, FIG. 7 shows an exemplary NOMA-based uplink transmission/reception (Tx/Rx) block diagram using a non-orthogonal spreading code of a communication device.

When multi-user data is transmitted via overlay transmission to the same time-frequency resource by using a spreading method, among the NOMA techniques, it is assumed that technique types (e.g., SCMA, CDMA, and so on) that are based on a Non-orthogonal Codebook correspond to a multiple access method using the Non-orthogonal Spreading Code. FIG. 6 and FIG. 7 respectively correspond to downlink and uplink transmitting/receiving end structures of a NOMA system performing overlay transmission by using a UE-specific spreading code. Although the UE-specific spreading code is used in a frequency axis in FIG. 6 and FIG. 7, the UE-specific spreading code may also be used in a time axis.

In the UE-specific code of a Spreading based MA, a codebook, which corresponds to a set of codes being used by the entire overlaying users, may have an orthogonal property or may have a non-orthogonal property. In case the codebook has the Non-orthogonal property, the spreading method may be categorized as a Non-orthogonal Multiple Access (NoMA) technique. In a spreading based MA, Multiuser Detection (MUD) may be operated for multi-user decoding in a receiving end, and diverse reception algorithms may be operated based on the spreading code that is used in the transmitting end (e.g., ML, MAP, MPA, MF, SIC, PIC, and so on).

The Spreading based MA scheme corresponds to a multi-user overlay transmission method, wherein each user may use a UE specific Codeword or Codebook, and this may be expressed as presented below.

$$C = [c^{(1)} \ \ldots \ c^{(K)}] = \begin{bmatrix} c_1^{(1)} & \ldots & c_1^{(K)} \\ \vdots & \ddots & \vdots \\ c_N^{(1)} & \ldots & c_N^{(K)} \end{bmatrix} \quad \text{[Equation 3]}$$

In Equation 3, which is presented above, $c^{(i)}$ indicates a UE specific Codeword or Codebook, which is used when a $j^{th}$ user transmits data by via Spreading based MA, and this may be configured to have a correlation with a UE specific Codeword or Codebook of another user. The entire Codebook C may be differently configured in accordance with the Spreading based MA scheme (e.g., SCMA[1], IDMA[21], NCMA[3], MC-CDMA, and so on).

Figure 8:
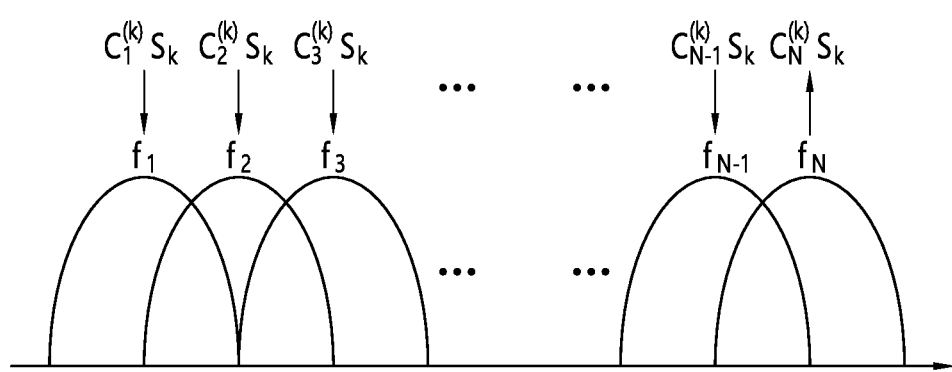
FIG. 8 shows a frequency axis conceptual diagram in a data transmission performed by a UE-specific codeword.

FIG. 8 shows a frequency axis conceptual diagram in a data transmission performed by a UE-specific codeword.

FIG. 8 shows a concept of transmitting, by a transmitting end (or receiving end), data of a $k^{th}$ UE in a frequency axis through a UE specific Codeword. When a UE Specific Codeword, which is defined by a Spreading based MA, is pre-arranged, a codeword corresponding to a $k^{th}$ user is multiplied by data for the $k^{th}$ user and then transmitted. At this point, Data symbol $s_k$ corresponds to a (N×1)-dimensional Codeword vector $c^\wedge(k)$. Accordingly, N number of elements of the Codeword correspond to N number of subcarriers.

More specifically, in FIG. 8, since one data symbol is transmission to n number of subcarriers, the time-frequency resource efficiency is reduced to 1/N as compared to the existing Legacy LTE System. Conversely, when N number of symbols or more are transmitted via overlay transmission, the time-frequency resource efficiency is increased as compared to the Legacy LTE System. For example, when N<K, when N number of symbols are transmitted via overlay transmission, the frequency resource efficiency is increased as much as K/N times.

Figure 9:
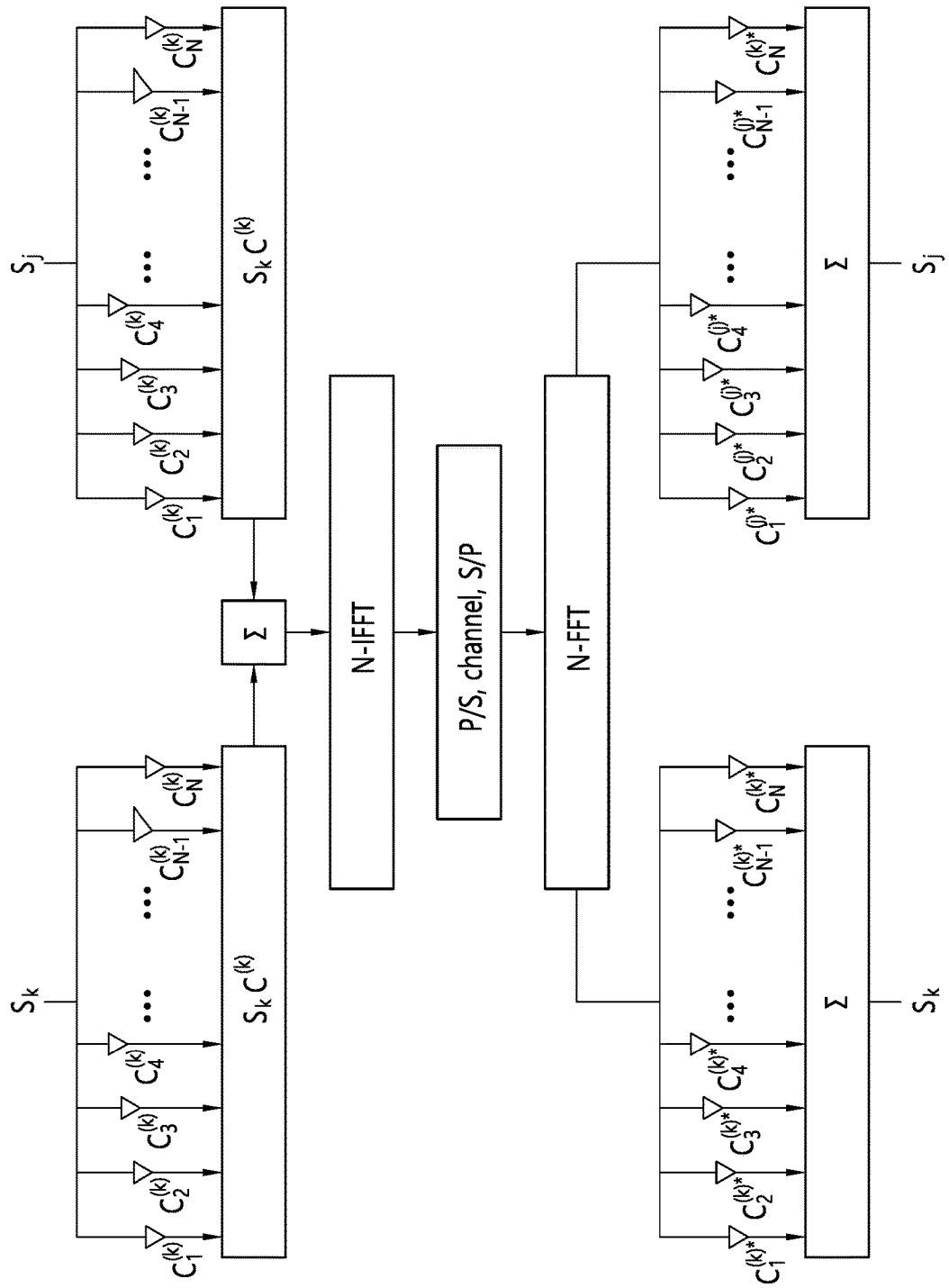
FIG. 9 shows an example of a basic transmission/reception (Tx/Rx) structural diagram of a Spreading based MA system.

FIG. 9 shows an example of a basic transmission/reception (Tx/Rx) structural diagram of a Spreading based MA system.

FIG. 9 is a basic (or default) transmission/reception (Tx/Rx) structural diagram of a Spreading based MA system using a UE Specific Codeword. In the transmitting end, the data symbol for each UE is converted to a UE Specific Codeword corresponding to each UE and then overlay one another. The overlaying N-length frequency-axis signal is converted to a time-axis signal via N-IFFT so as to perform OFDM transmission, and, then, the signal is recovered to the frequency-axis signal via N-FFT in the receiving end. The recovered frequency-axis signal decodes each UE data symbol by using a Conjugate Codeword of the UE Specific Codeword corresponding to each UE. The decoded $s_k$ may include a MUI according to the number of overlaying UEs, and an accurate $s_k$ decoding process may be performed by using a MUD method. At this point, the length of a frequency-axis signal being converted according to a predefined UE-specific NCC may be shorter than N. For example, if 2 frequency-axis signal vectors being converted to N/2-length UE-specific NCC are serially connected to form a length of N, it will be apparent that decoding may be performed in the receiving end even if N-FFT is performed.

Among the system being considered in 5G NR, in case of mMTC, wide coverage and high Connectivity are being considered. Conversely, a low-end UE, such as a sensor, may be adopted as an mMTC UE, and, in this case, a battery problem and a low-end Power Amp (PA) may be employed. In this case, the PAPR may act as a crucial metric, and, therefore, an uplink transmission technique for PAPR reduction is needed.

Therefore, the present specification intends to propose a UE specific DFT based MA scheme for PAPR Reduction.

Additionally, Control Signaling for a NoMA service is also needed. For example, the base station shall transmit a NoMA Signature (a medium for differentiating signals of other users within the NoMA System, e.g., Codebook, Sequence, Codeword, . . . ) to a UE for a UL NoMA System operation. However, in the conventional Grant, since diverse control signals, such as PRB size, Modulation and Coding Scheme (MCS) Level, and so on, exist, such control signals may act as a control overhead. Therefore, the present specification has been devised to propose a method for reducing such control signaling.

Embodiment 1. PRB Size Tied Spreading Factor

This embodiment proposes a method for determining a Spreading Factor of a NoMA transmission according to a Predefined/Allocated/Selected PRB size.

Figure 10:
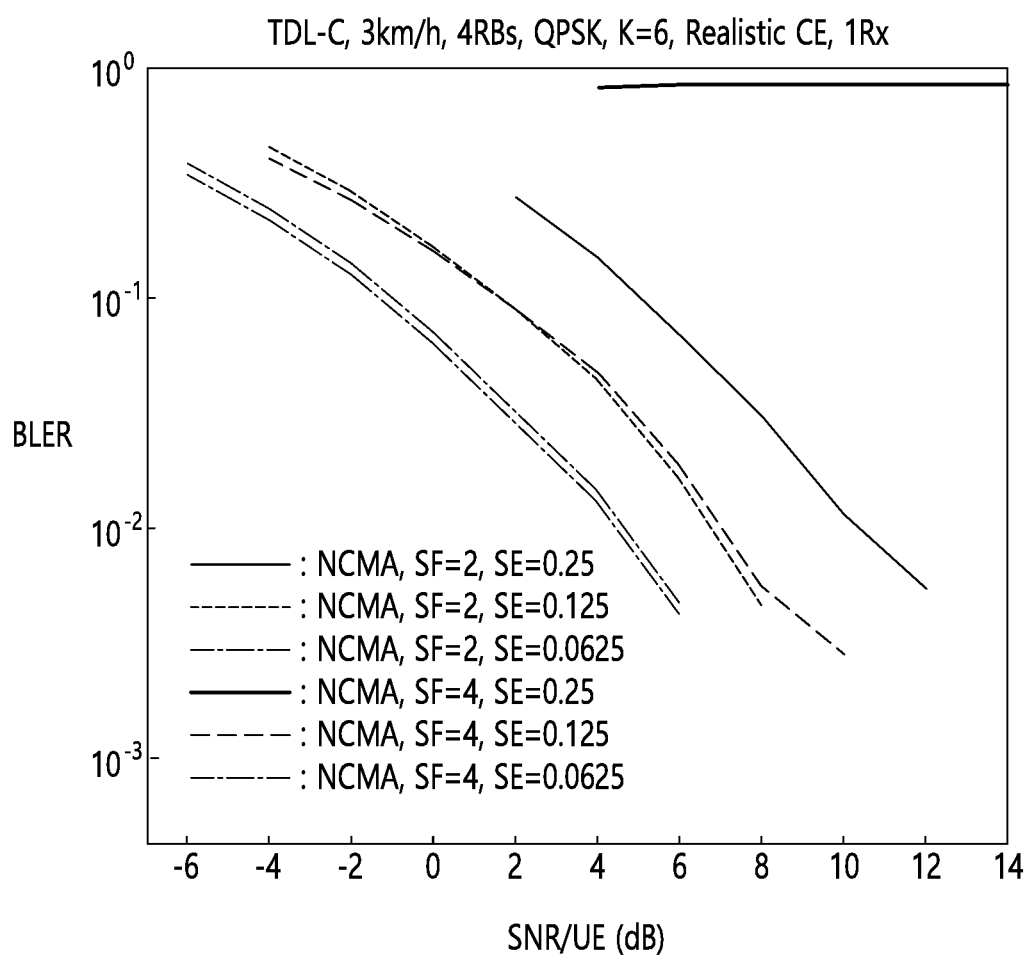
FIG. 10 is a graph showing a BLER value in accordance with a Spreading Factor in a NCMA scheme.
Figure 11:
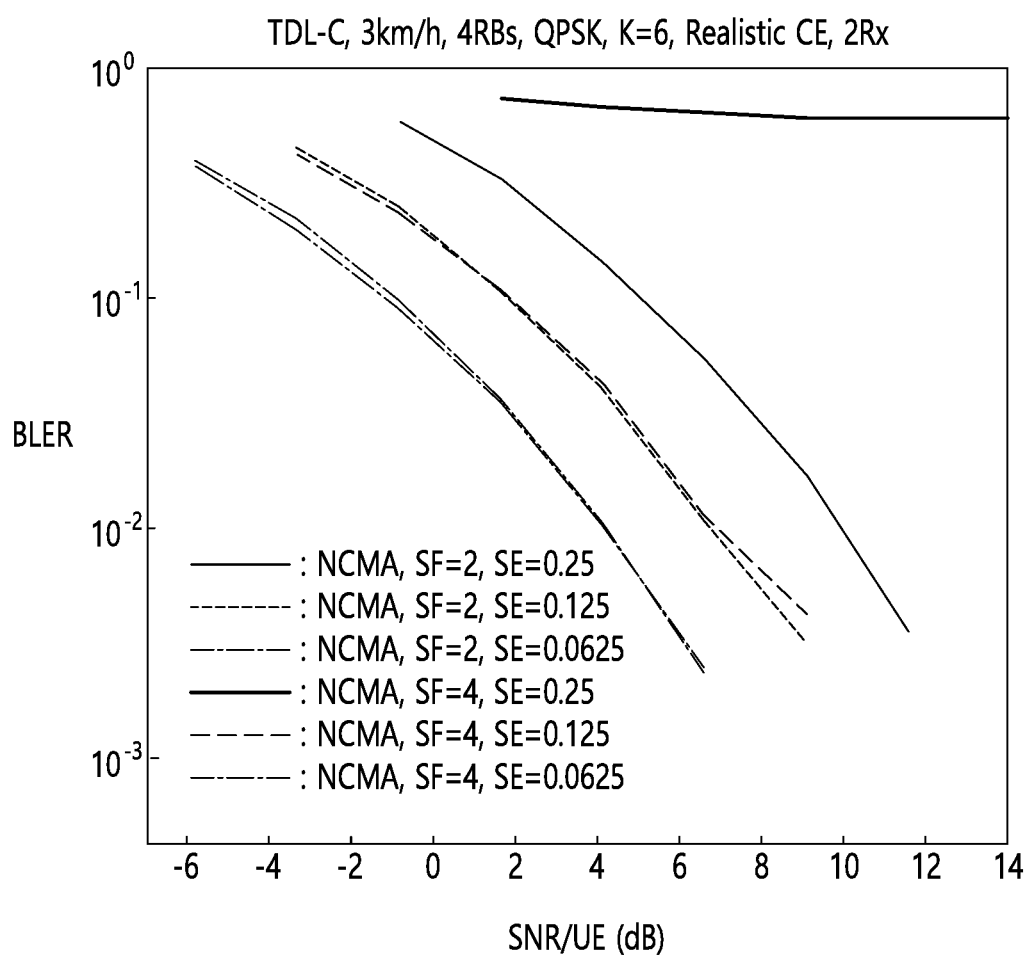
FIG. 11 is a graph showing a BLER value in accordance with a Spreading Factor in a NCMA scheme.

FIG. 10 and FIG. 11 are graphs respectively showing a BLER value in accordance with a Spreading Factor in a NCMA scheme. FIG. 10 shows a BLER value in case of 1Rx, and FIG. 11 shows a BLER value in case of 2Rx.

More specifically, results of the experiments shown in FIG. 10 and FIG. 11 indicate BLER Performance of Non-orthogonal Coded Multiple Access (NCMA), which corresponds to one of the NoMA techniques, when using 4RB in a TDL-C 300 ns, 3 km/h environment. In light of achieving the same Spectral Efficiency (SE), differences exist in the performance in accordance with the spreading factor (SF). When achieving SE in light of transmitting the same TBS to the same Time/Frequency, since a SE=M-order*(Code Rate) *(1/SF) relationship is established, when SF increases, the code rate that can be used also increases. For example, when the QPSK is assumed as M-order=2 for SE=0.25, in case of SF=2, a Code Rate of 1/4 may be used. Conversely, in case of SF=4, a Code Rate of 1/2 shall be used. As shown in the above-described results, in case of SF=4, due to an insufficient Code Rate, the BLER Performance decreases. More specifically, when the code rate is ensured to a predetermined level or more, the MUD Performance of the receiving end may be ensured. Therefore, when it is assumed that M-order=2, and if a Code Rate of 1/4 shall be ensured, the relationship between SE and SF may be determined as indicated below.

if SE=0.5, SF=1, and if SE=0.25, SF=2, and if SE=0.125, SF=4, and if SE=0.0625, SF=8, . . . .

This may be varied by the Physical Resources (PRBs) that are being used. For example, in light of transmitting the same TBS, when the PRB increases, the Code Rate may be decreased even if the SE is decreased. In other words, depending upon the TBS, the SE and the Code rate may be decreased due to the PRB that is/are being used. When considering an environment in which a TBS, such as mMTC, may be fixedly used, a relationship between the PRB, the SE, and the SF according to the TBS may be determined as indicated below.

TABLE 1

| TBS | # of PRBs | SE | SF |
|---|---|---|---|
| 72 bits | 1 | 0.5 | 1 |
|  | 2 | 0.25 | 2 |
|  | 4 | 0.125 | 4 |
|  | 8 | 0.0625 | 8 |
| 144 bits | 2 | 0.5 | 1 |
|  | 4 | 0.25 | 2 |
|  | 8 | 0.125 | 4 |
| . . . | . . . | . . . | . . . |

Based on the Look up table shown in Table 1, which is presented above, in an environment where the TBS is fixed, when a PRB is allocated, the SF value that shall be used may be known. In other words, the number of PRBs and the SF are tied. Accordingly, a NoMA Codebook Set Index according to the SF may be recognized based only one the PRB allocation. (Herein, the NoMA Codebook Set Index refers to a case where a different codebook is given according to the SF.) For example, in an environment where the TBS is fixed to 72 bits, the NoMA Codebook Set Index is recognized as shown below.

TABLE 2

| # of PRBs | SF | NoMA Codebook Set Index |
|---|---|---|
| 1 | 1 | 0 |
| 2 | 2 | 1 |
| 4 | 4 | 2 |
| ... | ... | ... |

According to the Look up table of Table 2, which is presented above, based upon the tied relationship between the number of PRBs and the SF value, a NoMA Codebook Set Index Indication may be performed. Alternatively, the UE may recognize the Index without any SF indication.

In case multiple Codebook Sets exist for the same SF, the number of PRBs and NoMA Codebook Sets may be tied (or connected or matched) to one another by using the pattern presented below.

TABLE 3

| # of PRBs | SF | NoMA Codebook Set Index |
|---|---|---|
| 1 | 1 | 0, 1, 2 |
| 2 | 2 | 3, 4, 5 |
| 4 | 4 | 6, 7, 8 |
| ... | ... | ... |

For example, when it is given that 3 Codebook Sets exist for each SF, since the # of PRBs and the SF value are tied, the 3 Codebook Sets existing for each SF are connected to each # of PRBs. More specifically, when the base station indicates information re-indexing the # of PRBs and the 3 codebooks being connected to the corresponding # of PRBs to a UE, the UE may recognize an accurate NoMA Codebook Set Index.

More specifically, in light of the UCI, among information on the Physical Resource that is to conventionally intended to be used (PRB Number, # of PRBs, . . . ), information on the NoMA Codeword (NoMA Codebook Set Index, NoMA Codebook Index, NoMA Codeword Index, . . . ), the NoMA Codebook Set Index may be recognized by using only the information on the Physical Resource. More specifically, a Control Overhead may be reduced.

Similarly, when considering the Contention based Transmission, since the size of a Contention Zone may be defined as a PRB, the NoMA Codebook Set that is to be used may be determined in accordance with the size of a Contention Zone.

In the aforementioned method, a reference code rate or a reference TBS may be varied depending upon the system environment, and it will be apparent that the relationship equation between the SE and the SF may be varied.

Similarly to the aforementioned method, according to the Look up table or a pre-determined rule, a NoMA Codebook Set Index or TBS may be indicated based on the tied relationship between the number of PRBs and the MCS level. In an environment where Link adaptation may be applied, the MCS level may be adjusted, and the adjusted MCS level may be designated as the MCS level via signaling for the PRB index. And, when the MCS level is designated, an operation indicating the NoMA Codebook Set Index or TBS may be performed. For example, as shown below in the table, the UE may recognize the NoMA Codebook Set Index or TBS.

TABLE 4

| # of PRBs | MCS Level | NoMA Codebook Set Index | TBS |
|---|---|---|---|
| 1 | 0 | 0 | 72 bits |
| 2 | 1 | 1 | 144 bits |
| 4 | 2 | 2 | 288 bits |
| ... | ... | ... | ... |

Similarly to the aforementioned method, according to the Look up table or a pre-determined rule, a NoMA Codebook Set Index or TBS may be indicated based on the tied relationship between the number of PRBs and the number of Multiple Layers. Herein, if the UE (or user) supports multiple layers, a single user may overlay two or more data layers and then perform overlay transmission by using two or more NoMA Spreading Sequences. For example, as shown below, the UE may recognize the NoMA Codebook Set Index or TBS.

TABLE 5

| # of PRBs | # of Multiple Layer | NoMA Codebook Set Index | TBS |
|---|---|---|---|
| 1 | 1 | 0 | 72 bits |
| 2 | 2 | 1 | 144 bits |
| 4 | 4 | 2 | 288 bits |
| ... | ... | ... | ... |

In the description presented above, a case where 1:1 mapping of the number of PRBs and the MCS level is performed, and/or a case where 1:1 mapping of the number of PRBs and the number of multiple layers is performed are given as example, it will be apparent that a 1:M mapping relationship or a M:1 mapping relationship may be established between the number of PRBs and the MCS level and/or between the number of PRBs and the number of multiple layers. It will be apparent that, in the aforementioned method, a reference code rate or a reference TBS or a NoMA Codebook Set Index may be varied depending upon the system environment.

Embodiment 2. UE Specific DFT/IDFT Based NoMA

Figure 12:
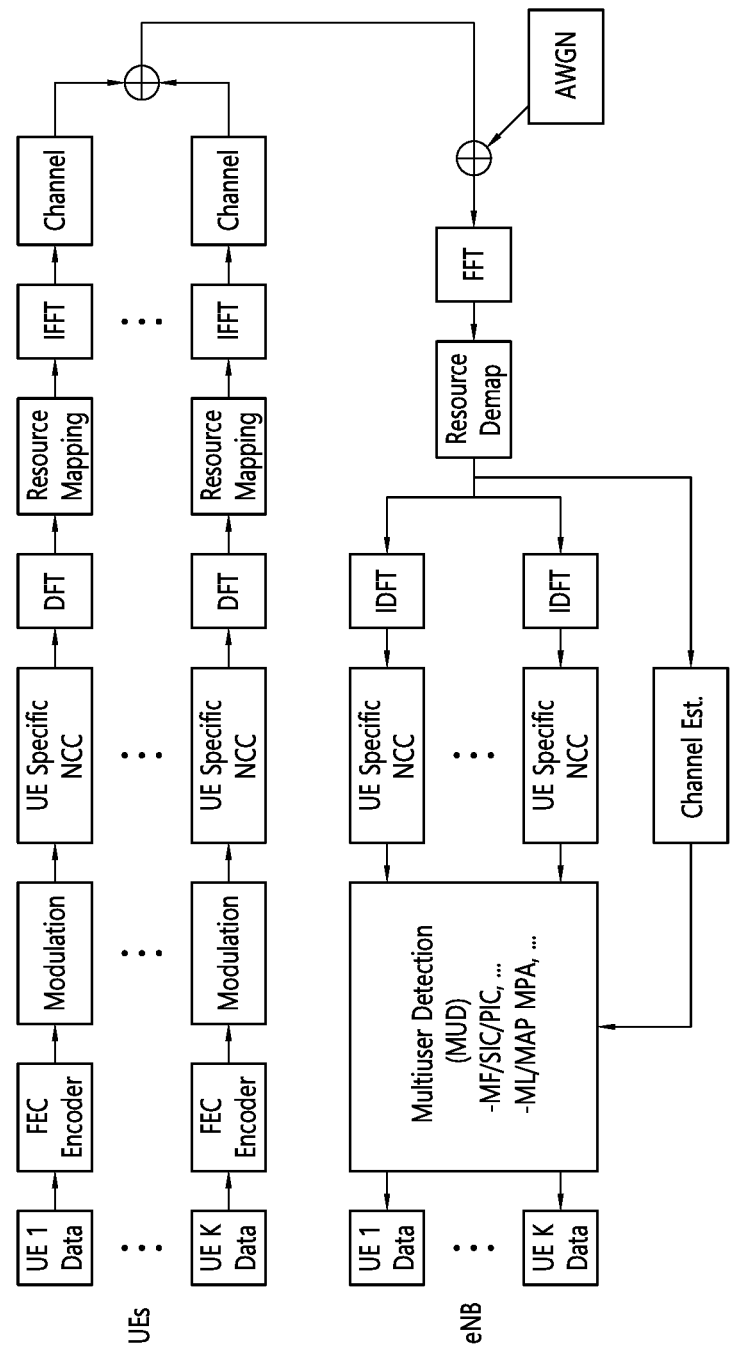
FIG. 12 shows an exemplary NOMA-based uplink transmission/reception (Tx/Rx) block diagram applying DFT and using a non-orthogonal spreading code.

In this embodiment, proposed herein is a UE specific DFT based MA scheme for PAPR Reduction. In order to achieve PAPR Reduction, the transmitting/receiving ends may apply DFT/IDFT as shown in FIG. 12. FIG. 12 shows an exemplary NoMA-based uplink transmission/reception (Tx/Rx) block diagram applying DFT and using a non-orthogonal spreading code.

The following notations are used for the description of the specification.

N: The number of allocated subcarriers (=DFT/IDFT size)
M: The number of total subcarriers (=IFFT/FFT size)
SF: Spreading Factor of UE specific Codeword for NoMA
K=N/SF: DFT to Spreading Factor Ratio
$c^{(i)} = [c_1, \ldots, c_{SF}]^T$: Predefined/Allocated/Selected UE specific Codeword of ith UE
$w = e^{\wedge}((-2\pi j)/N)$: Linear Phase of DFT $$W = \frac{1}{\sqrt{N}} \begin{bmatrix} w^{0 \cdot 0} & w^{0 \cdot 1} & \ldots & w^{0 \cdot (N-2)} & w^{0 \cdot (N-1)} \\ w^{1 \cdot 0} & w^{1 \cdot 1} & \ldots & w^{1 \cdot (N-2)} & w^{1 \cdot (N-1)} \\ \vdots & \vdots & \ddots & \vdots & \vdots \\ w^{(N-2) \cdot 0} & w^{(N-2) \cdot 1} & \ldots & w^{(N-2) \cdot (N-2)} & w^{(N-2) \cdot (N-1)} \\ w^{(N-1) \cdot 1} & w^{(N-1) \cdot 1} & \ldots & w^{(N-1) \cdot (N-2)} & w^{(N-1) \cdot (N-1)} \end{bmatrix};$$

DFT matrix $x^{(i)} = [x_1, \ldots, x_K]^T$: The vector of transmit symbols after Modulation Processing for an OFDM symbol of $i^{th}$ UE $X^{(i)} = [X_1, \ldots, X_N]^T$: The vector of transmit symbols after DFT Processing for an OFDM symbol of $i^{th}$ UE Accordingly, in case DFT is applied to a Spreading based NoMA of FIG. 12, signals after the DFT of an $i^{th}$ UE, which corresponds to the transmitting end, may be generated as described below.

[Equation 4]

$$X^{(i)} = W(x^{(i)} \otimes c^{(i)})$$

$$X^{(i)} = \frac{1}{\sqrt{N}} \begin{bmatrix} w^{0 \cdot 0} & w^{0 \cdot 1} & \cdots & w^{0 \cdot (N-2)} & w^{0 \cdot (N-1)} \\ w^{1 \cdot 0} & w^{1 \cdot 1} & \cdots & w^{1 \cdot (N-2)} & w^{1 \cdot (N-1)} \\ \vdots & \vdots & \ddots & \vdots & \vdots \\ w^{(N-2) \cdot 0} & w^{(N-2) \cdot 1} & \cdots & w^{(N-2) \cdot (N-2)} & w^{(N-2) \cdot (N-1)} \\ w^{(N-1) \cdot 1} & w^{(N-1) \cdot 1} & \cdots & w^{(N-1) \cdot (N-2)} & w^{(N-1) \cdot (N-1)} \end{bmatrix} \left( \begin{bmatrix} x_1 \\ \vdots \\ x_K \end{bmatrix} \otimes \begin{bmatrix} c_1 \\ \vdots \\ c_{SF} \end{bmatrix} \right)$$

$$X^{(i)} = \frac{1}{\sqrt{N}} \begin{bmatrix} w^{0 \cdot 0} & w^{0 \cdot 1} & \cdots & w^{0 \cdot (N-2)} & w^{0 \cdot (N-1)} \\ w^{1 \cdot 0} & w^{1 \cdot 1} & \cdots & w^{1 \cdot (N-2)} & w^{1 \cdot (N-1)} \\ \vdots & \vdots & \ddots & \vdots & \vdots \\ w^{(N-2) \cdot 0} & w^{(N-2) \cdot 1} & \cdots & w^{(N-2) \cdot (N-2)} & w^{(N-2) \cdot (N-1)} \\ w^{(N-1) \cdot 1} & w^{(N-1) \cdot 1} & \cdots & w^{(N-1) \cdot (N-2)} & w^{(N-1) \cdot (N-1)} \end{bmatrix} \begin{bmatrix} x_2 \cdot \begin{bmatrix} c_1 \\ \vdots \\ c_{SF} \end{bmatrix} \\ \vdots \\ x_K \cdot \begin{bmatrix} c_1 \\ \vdots \\ c_{SF} \end{bmatrix} \end{bmatrix}$$

Herein, the operator $\otimes$ indicates a Kroneker Product, and this may also be understood as a Tensor Product.

More specifically, in Equation 4, which is presented above, only K number of multiplication operations of each symbol and a (SF×1) vector and the multiplication operation of a ((K*SF)×1) vector and a (N×N) matrix are required. Depending upon the implementation method, some differences may exist in the above-described operation.

Figure 13:
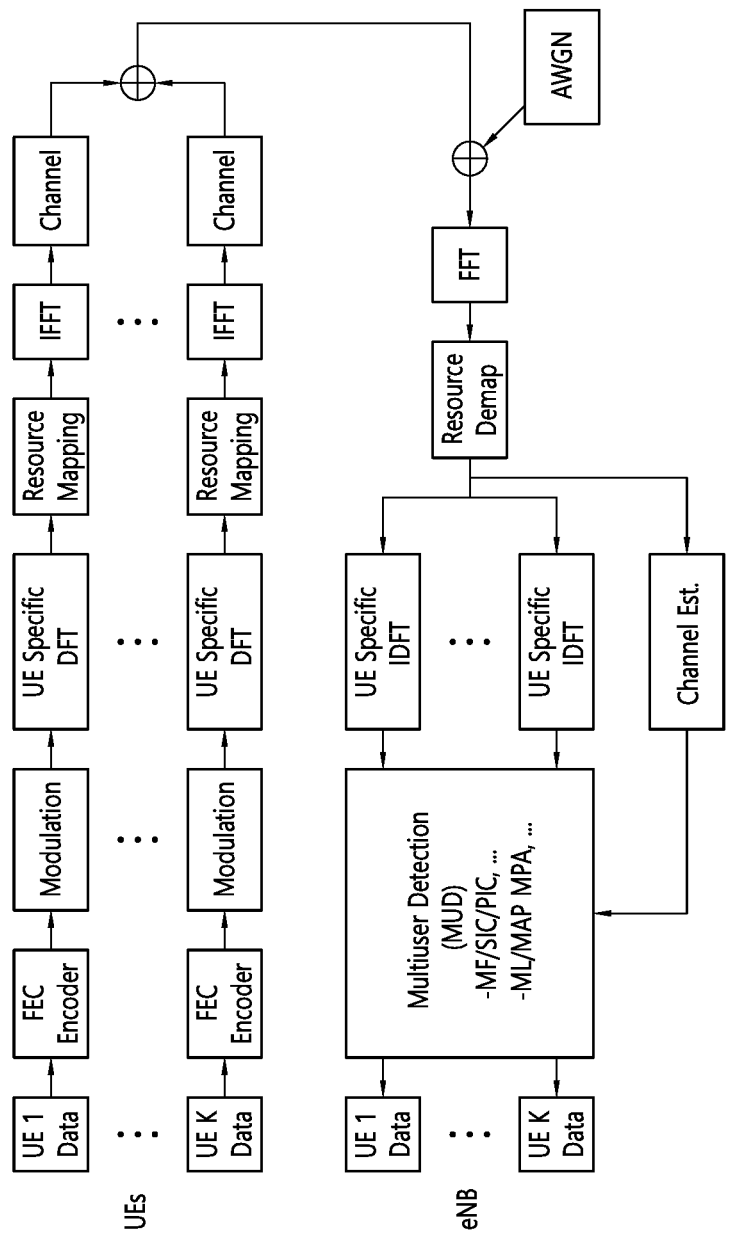
FIG. 13 shows a transmission/reception (Tx/Rx) block diagram in an uplink environment, when UE-specific DFT is applied.

Conversely, when applying the UE specific DFT that is proposed in the present specification, this may be expressed as shown in FIG. 13. (Each user may use UE specific DFT.) FIG. 13 shows an exemplary NoMA-based uplink transmission/reception (Tx/Rx) block diagram using UE-specific DFT is applied.

FIG. 13 shows a transmission/reception (Tx/Rx) block diagram in an uplink environment, when UE-specific DFT is applied. Each user is spread to a different UE-specific DFT, and IFFT is performed via Resource Mapping of the spread subcarrier, and, then, a Time domain signal is generated and transmitted through a channel. In the receiving end, after performing FFT and Resource Demapping, UE specific IDFT is performed. Accordingly, MUD is performed based on the estimated channel estimation. In the above-described process, the UE specific DFT/IDFT and the size of the IFFT/FFT may be different. Additionally, in the above-described process, the physical resource being used by all users assumed the same environment. More specifically, multi-user signals are transmitted via overlay transmission through the same physical resource. And, in the receiving end, the signals for multi-users may be differentiated (or identified) by performing UE specific DFT and MUD.

A UE specific DFT matrix may be configured of a UE specific DFT vector and a Phase vector, as presented below.

UE specific DFT matrix:

$$W_{UE_i} = [v_{UE_i} \circ \varphi_0, \ldots, v_{UE_i} \circ \varphi_{K-1}] = \frac{1}{\sqrt{N}} \begin{bmatrix} \sum_{l=1}^{SF} c_l \cdot w^{0 \cdot (l-1+k \cdot SF)} \Big|_{k=0,\ldots,K-1} \\ \vdots \\ \sum_{l=1}^{SF} c_l \cdot w^{(N-1) \cdot (l-1+k \cdot SF)} \Big|_{k=0,\ldots,K-1} \end{bmatrix}$$

Herein, operator $\circ$ indicates a Hadamard Product and operates as an element-wise product.

UE specific DFT vector:

$$v_{UE_i} = \frac{1}{\sqrt{N}} \begin{bmatrix} \sum_{l=1}^{SF} c_l \cdot w^{0 \cdot (l-1)} \\ \vdots \\ \sum_{l=1}^{SF} c_l \cdot w^{(N-1) \cdot (l-1)} \end{bmatrix},$$

where $c_l$ is the $l^{th}$ coefficient of $c^{(i)}$

Phase vector:

$$\varphi_k = \begin{bmatrix} w^{0 \cdot (k \cdot SF)} \\ \vdots \\ w^{(N-1) \cdot (k \cdot SF)} \end{bmatrix}, \text{ for } k = 0, \ldots K-1$$

The UE specific DFT vector $vu_E$, is determined by a Predefined/Allocated/Selected UE specific Codeword $c^{(i)}$.

Phase vector: $\varphi_k$ corresponds to a vector common being used by the entire transmitting/receiving ends, and this is determined by a Spreading Factor SF and a DFT to Spreading Factor Ratio K.

More specifically, $W_{UEi}$ indicates a (N×K) UE specific DFT matrix, and this is configured by a (N×1) UE specific DFT vector $v_{UEi}$.

Accordingly, in case of a UE specific DFT based NoMA of FIG. 13, signals after a UE specific DFT of an $i^{th}$ UE, which corresponds to a transmitting end, are generated as presented below.

$$X^{(i)} = W_{UE_i} x^{(i)} \quad \text{[Equation 5]}$$

$$X^{(i)} = \frac{1}{\sqrt{N}} \begin{bmatrix} \left.\sum_{l=1}^{SF} c_l \cdot w^{0 \cdot (l-1+k \cdot SF)}\right|_{k=0,\ldots,K-1} \\ \vdots \\ \left.\sum_{l=1}^{SF} c_l \cdot w^{(N-1) \cdot (l-1+k \cdot SF)}\right|_{k=0,\ldots,K-1} \end{bmatrix} \begin{bmatrix} x_1 \\ \vdots \\ x_K \end{bmatrix}$$

More specifically, in this model, only the multiplication operation of a (N×K) UE specific DFT matrix and a transmission (K×1) symbol vector is required. Depending upon the implementation method, some differences may exist in the above-described operation. Accordingly, the amount of arithmetic operation of the transmitting end may be reduced.

Since the (N×K) UE specific DFT matrix is configured of a Hadamard Product of (N×1) UE specific DFT vector $v_{UEi}$, and (N×1) Common Phase vector $\varphi_k$, based on a repeated usage of the Predefined/Allocated/Selected UE specific Codeword $c^{(i)}$, only the UE specific DFT vector $v_{UEi}$, or the UE specific DFT matrix $W_{UEi}$ may be stored in the device memory so as to be used.

The UE specific IDFT matrix may be configured as a Hermitian of the UE specific DFT matrix.

UE specific IDFT matrix: $W_{UEi}^H$

Herein, the operator $(A)^H$ indicates a Hermitian matrix of the A matrix.

More specifically, $W_{UEi}^H$ indicates a (K×N) UE specific IDFT matrix.

Accordingly, in case of a UE specific DFT based NoMA of FIG. 13, signals after a UE specific IDFT in the base station, which corresponds to a receiving end, are generated as presented below.

$$y^{(i)} = W_{UE_i}^H y \quad \text{[Equation 6]}$$

More specifically, in this model, only the multiplication operation of a (K×N) UE specific DFT matrix and a reception (N×1) symbol vector is required. Depending upon the implementation method, some differences may exist in the above-described operation. Accordingly, the amount of arithmetic operation of the receiving end may be reduced.

Since the (K×N) UE specific IDFT matrix is generated as a Hermitian of a matrix, which is configured of a Hadamard Product of (N×1) UE specific DFT vector $v_{UEi}$ and (N×1) Common Phase vector $\varphi_k$, based on a repeated usage of the Predefined/Allocated/Selected UE specific Codeword $c^{(i)}$, only the UE specific DFT vector $v_{UEi}$ may be stored in the device memory so as to be used.

The UE specific DFT/IDFT that is presented above has a property of a spreading code for MUD and a property of Discrete Fourier Transform for PAPR reduction in a transmitting end at the same time.

Embodiment 3. PRB Size Tied UE Specific DFT/IDFT Based NoMA

A UE specific DFT/IDFT matrix is determined by a PRB size that is allocated or selected based on Embodiment 1 and Embodiment 2.

In case of a Scheduling based Transmission, based on UCI or RRC Signaling or Predefined PRB size information and NoMA Codeword Index information, a UE specific Codeword $c^{(i)}$ of UE i may be determined from a NoMA Codebook Set. By doing so, a UE specific DFT/IDFT matrix may be determined and used.

In case of a Contention based Transmission, based on RRC Signaling or Predefined Contention Zone information and selected NoMA Codeword Index information, a UE specific Codeword $c^{(i)}$ of UE i may be determined from a NoMA Codebook Set. By doing so, a UE specific DFT/IDFT matrix may be determined and used.

Figure 14:
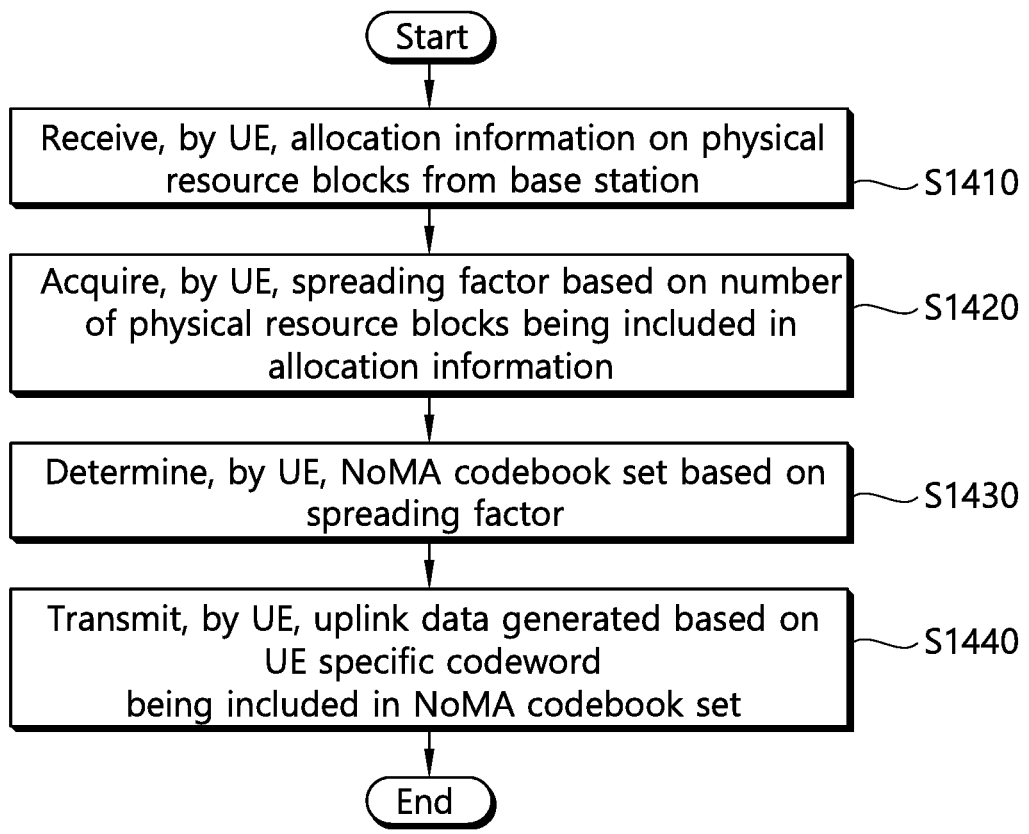
FIG. 14 is a procedural flowchart showing a procedure of transmitting uplink data based on a non-orthogonal multiple-access scheme according to the present embodiment.

FIG. 14 is a procedural flowchart showing a procedure of transmitting uplink data by using a non-orthogonal multiple-access scheme according to the present embodiment.

More specifically, this embodiment assumes a wireless communication system environment using a general Non-orthogonal Multiple Access (NoMA) scheme. A general Non-orthogonal Multiple Access (NoMA) scheme may correspond to a spreading based multiple access scheme using a UE-specific codeword. Accordingly, the Non-orthogonal Multiple Access (NoMA) scheme may be proposed as a method of overlay transmitting a signal for multi-users to the same time-frequency resource.

In step S1410, a UE receives allocation information for a Physical Resource Block (PRB) from a base station. The allocation information for a Physical Resource Block (PRB) may include a number of physical resource blocks (PRBs) and/or a size of a Physical Resource Block (PRB).

In step S1420, the UE acquires a spreading factor based on the number of physical resource blocks included in the allocation information. At this point, the number of physical resource blocks and the spreading factor are tied to one another and may be pre-defined in a table. More specifically, in an environment where a transport block size (TBS) is fixed based on the pre-defined table, when a physical resource block is allocated, a value of a spreading factor that shall be used may be known.

Additionally, the UE may acquire a Modulation and Coding Scheme (MCS) level or a number of multiple layers based on the number of physical resource blocks included in the allocation information. Similarly, the number of physical resource blocks and the MCS level are tied to one another and may be pre-defined in a table. And, the number of physical resource blocks and the number of multiple layers are tied to one another and may be pre-defined in a table.

In step S1430, the UE determines a NoMA codebook set based on the spreading factor. The NoMA codebook set may be known through an index value. At this point, the spreading factor and the NoMA codebook set are tied to one another and may be pre-defined in a table. Accordingly, even a NoMA codebook set according to the spreading factor may be recognized by using only the physical resource block allocation. Herein, it is assumed that the NoMA codebook set has a different codebook in accordance with the spreading factor.

Additionally, the MCS level and the NoMA codebook set are also tied to one another and may be pre-defined in a table. Moreover, the number of multiple layers and the NoMA codebook set are tied to one another and may be pre-defined in a table. Accordingly, even a NoMA codebook set according to the MCS level or the number of multiple layers may be recognized by using only the physical resource block allocation. Herein, it is assumed that the NoMA codebook set has a different codebook in accordance with the MCS level or the number of multiple layers.

Additionally, a network environment where the TBS is not fixed may also be assumed. At this point, the UE may determine a Transport Block Size (TBS) based on the spreading factor. At this point, the spreading factor and the TBS are tied to one another and may be pre-defined in a table. Additionally, the MCS level and the TBS are tied to one another and may be pre-defined in a table. And, the number of multiple layers and the TBS are tied to one another and may be pre-defined in a table. Accordingly, even a TBS according to the spreading factor or the MCS level or the number of multiple layers may be recognized by using only the physical resource block allocation. Herein, it is assumed that the TBS has a different size in accordance with the spreading factor or the MCS level or the number of multiple layers.

According to the above-described embodiment, the information on the NoMA codebook set or the information on the TBS may be recognized by using only the information on the physical resource without performing any additional signaling. Therefore, control overhead according to signaling may be reduced.

In case a plurality of NoMA codebook sets are tied to the spreading factor or the MCS level or the number of multiple layers, the UE may further receive, from the base station, indication information including one NoMA codebook set among the plurality of NoMA codebook sets being tied to the spreading factor or the MCS level or the number of multiple layers. In this case, additional indication information may be needed in order to allow the UE to recognize an accurate index of a NoMA codebook set.

In step S1440, the UE transmits uplink data that is generated based on a UE specific codeword being included in the NoMA codebook set.

Additionally, in the NoMA scheme, a UE specific DFT based multiple access scheme for reducing the PAPR may be proposed. More specifically, in order to reduce the PAPR, the transmitting end (UE) may apply UE specific DFT, and the receiving end (base station) may apply UE specific IDFT.

The uplink data may be generated after the DFT is performed by the UE specific Discrete Fourier Transform (DFT) matrix. Each UE may be spread to a different UE specific DFT, and, then, Inverse Fast Fourier Transform (IFFT) may be performed via resource mapping of the spread subcarrier. Thereafter, a time domain signal is generated, which is then transmitted through a channel.

The UE specific DFT matrix may be determined based on a UE specific DFT vector and a phase vector. More specifically, the UE specific DFT matrix may be obtained by a Hadamard Product the UE specific DFT vector and the phase vector. At this point, the UE specific DFT vector may be determined based on the UE specific codeword. The phase vector may be determined based on the spreading factor.

Additionally, a UE specific Inverse Discrete Fourier Transform (IDFT) matrix allowing the receiving end to apply UE specific IDFT may correspond to a Hermitian matrix of the UE specific DFT matrix.

Additionally, the UE specific DFT matrix may be determined based on a size of the physical resource block. More specifically, the UE may determine a UE specific codeword being included in the NoMA codebook set based on the size of the physical resource block and the NoMA codebook index information. The UE specific DFT matrix or the UE specific IDFT matrix may be determined by using the UE specific codeword.

Figure 15:
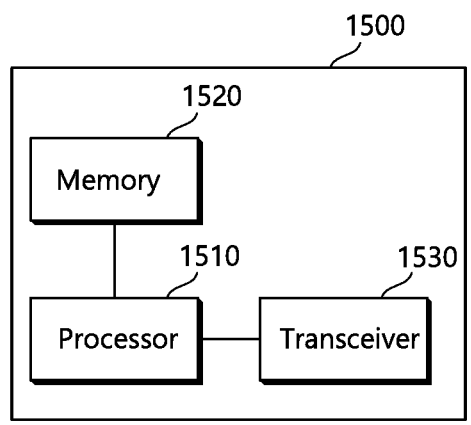
FIG. 15 is a block diagram showing an apparatus for wireless communication for implementing an embodiment of the present specification.

FIG. 15 is a block diagram showing a wireless device to which an exemplary embodiment of this specification can be applied.

Referring to FIG. 15, as a station (STA) that can implement the above-described exemplary embodiment, the wireless device may operate as an AP or a non-AP STA. Additionally, the wireless device may correspond to a user, or the user may correspond to a transmitting device transmitting a signal to the receiving device.

As shown in the drawing, the wireless device of FIG. 15 includes a processor (1510), a memory (1520), and a transceiver (1530). Each of the processor (1510), memory (1520), and transceiver (1530) shown in FIG. 15 may be implemented as a separate chip, or at least two or more blocks/functions may be implemented through a single chip.

The transceiver (1530) is a device including a transmitter and a receiver, and when a specific operation is performed, the transceiver (1530) may perform the operations of any one of the transmitter and the receiver, or the transceiver may perform the operations of both the transmitter and the receiver. The transceiver (1530) may include one or more antennas transmitting and/or receiving radio signals. Additionally, the transceiver (1530) may include an amplifier for amplifying a reception signal and/or a transmission signal and a band-pass filter for performing transmission over a specific frequency band.

The processor (1510) may implement functions, processes, and/or methods proposed in this specification. For example, the processor (1510) may perform operations according to the above-described exemplary embodiment of this specification. More specifically, the processor (1510) may perform the operations disclosed in the exemplary embodiment shown in FIG. 1 to FIG. 14.

The processor (1510) may include an application-specific integrated circuit (ASIC), a separate chipset, a logic circuit, a data processing unit, and/or a converter inter-converting baseband signals and radio signals. The memory (1520) may include a read-only memory (ROM), a random access memory (RAM), a flash memory, a memory card, a storage medium, and/or other equivalent storage devices.

Figure 16:
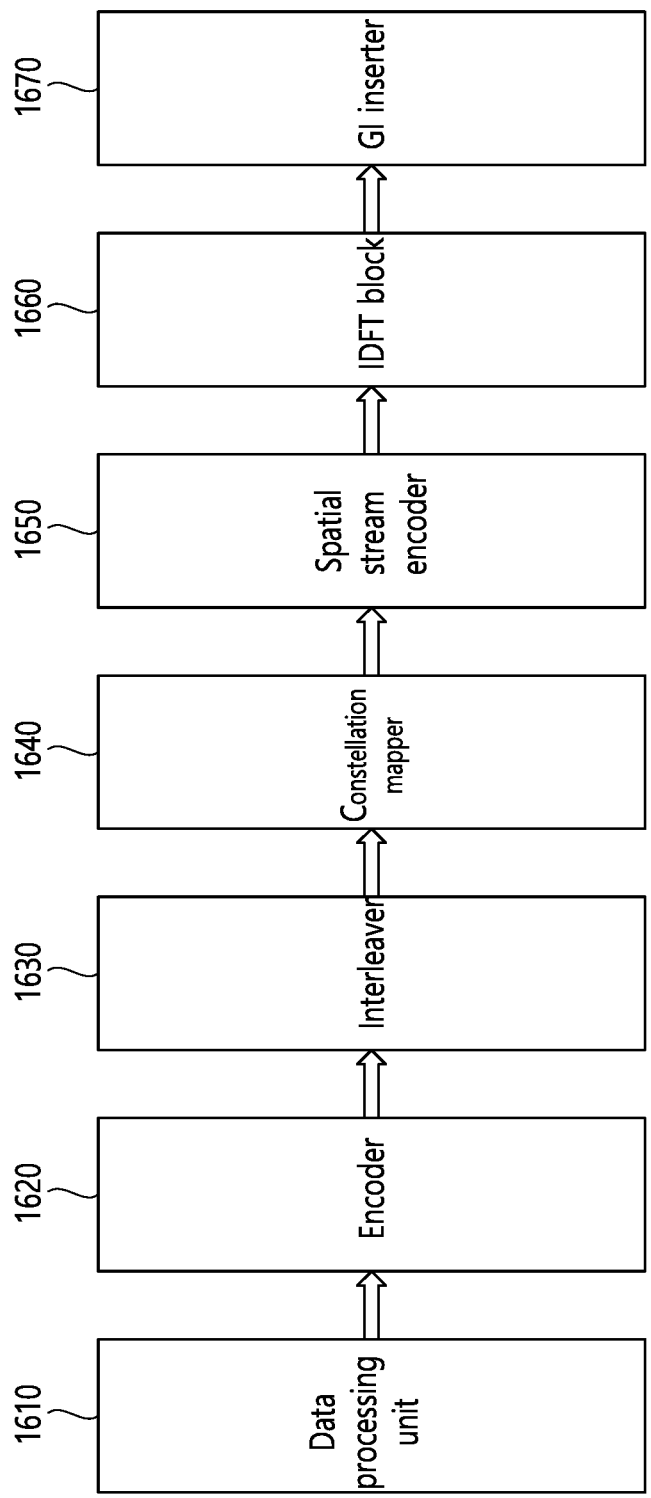
FIG. 16 is a block diagram showing an example of a device being included in a processor.

FIG. 16 is a block diagram showing an example of a device being included in a processor. For simplicity in the description, although an example of FIG. 16 is described based on a block for a transmission signal, it will be apparent that a reception signal may be processed by using the corresponding block.

A data processing unit (1610) shown in FIG. 16 generates transmission data (control data and/or user data) corresponding to a transmission signal. An output of the data processing unit (1610) may be inputted to an encoder (1620). The encoder (1620) may perform coding by using binary convolutional code (BCC) or low-density parity-check (LDPC) coding schemes. At least one encoder (1620) may be included herein, and the number of encoders (1620) may be determined based on diverse information (e.g., number of data streams).

An output of the encoder (1620) may be inputted to an interleaver (1630). The interleaver (1630) may perform operations of distributing consecutive bit signals within a radio resource (e.g., time and/or frequency) in order to prevent any burst error, which is caused by fading, and so on. At least one interleaver (1630) may be included herein, and the number of interleavers (1630) may be determined based on diverse information (e.g., number of spatial streams).

An output of the interleaver (1630) may be inputted to a constellation mapper (1640). The constellation mapper (1640) may perform constellation mapping, such as biphase shift keying (BPSK), Quadrature Phase Shift Keying (QPSK), n-quadrature amplitude modulation (QAM), and so on.

An output of the constellation mapper (1640) may be inputted to a spatial stream encoder (1650). The spatial stream encoder (1650) performs data processing in order to transmit a transmission signal via at least one spatial stream. For example, the spatial stream encoder (1650) may perform at least one of space-time block coding (STBC), Cyclic shift diversity (CSD) insertion, and spatial mapping on the transmission signal.

An output of the spatial stream encoder (1650) may be inputted to an IDFT (1660) block. The IDFT (1660) block may perform inverse discrete Fourier transform (IDFT) or inverse Fast Fourier transform (IFFT).

An output of the IDFT (1660) block is inputted to a Guard Interval (GI) inserter (1670), and an output of the GI inserter (1670) is inputted to the transceiver (1530) of FIG. 15.

What is claimed is:

1. A method of transmitting uplink data based on Non-orthogonal Multiple Access (NoMA) in a wireless communication system, comprising:
   receiving, by a user equipment (UE), allocation information on physical resource blocks from a base station;
   acquiring, by the UE, a spreading factor based on a number of the physical resource blocks included in the allocation information;
   determining, by the UE, a NoMA codebook set based on the spreading factor; and
   transmitting, by the UE, uplink data being generated based on a UE specific codeword being included in the NoMA codebook set.

2. The method of claim 1, further comprising:
   acquiring, by the UE, a Modulation and Coding Scheme (MCS) level or a number of multiple layers based on the number of physical resource blocks being included in the allocation information; and
   determining, by the UE, a Transport Block Size (TBS) based on the spreading factor.

3. The method of claim 2, wherein the number of physical resource blocks and the spreading factor are tied to one another and pre-defined in a table,
   wherein the number of physical resource blocks and the MCS level are tied to one another and pre-defined in a table, and
   wherein the number of physical resource blocks and the number of multiple layers are tied to one another and pre-defined in a table.

4. The method of claim 3, wherein the spreading factor and the NoMA codebook set, or the MCS level and the NoMA codebook set, or the number of multiple layers and the NoMA codebook set are tied to one another and pre-defined in a table, and
   wherein the spreading factor and the TBS, or the MCS level and the TBS, or the number of multiple layers and the TBS are tied to one another and predefined in a table.

5. The method of claim 4, further comprising:
   in case a plurality of NoMA codebook sets are tied to the spreading factor or the MCS level or the number of multiple layers, receiving, by the UE, indication information including one NoMA codebook set among the plurality of NoMA codebook sets being tied to the spreading factor or the MCS level or the number of multiple layers.

6. The method of claim 1, wherein the uplink data is generated after DFT is performed by the UE specific Discrete Fourier Transform (DFT) matrix,
   wherein the UE specific DFT matrix is determined based on a UE specific DFT vector and a phase vector,
   wherein the UE specific DFT vector is determined based on the UE specific codeword, and
   wherein the phase vector is determined based on the spreading factor.

7. The method of claim 6, wherein a UE specific Inverse Discrete Fourier Transform (IDFT) matrix is a Hermitian matrix of the UE specific DFT matrix.

8. The method of claim 7, wherein the UE specific DFT matrix is determined based on a size of the physical resource block.

9. A user equipment (UE) transmitting uplink data based on a Non-orthogonal Multiple Access (NoMA) scheme in a wireless communication system, comprising:
   a transceiver transmitting and receiving radio signals; and
   a processor being operatively connected to the transceiver,
   wherein the processor is configured:
   to receive allocation information on physical resource blocks from a base station,
   to acquire a spreading factor based on a number of the physical resource blocks included in the allocation information,
   to determine a NoMA codebook set based on the spreading factor, and
   to transmit uplink data being generated based on a UE specific codeword being included in the NoMA codebook set.

10. The user equipment of claim 9, wherein the processor is configured:
    to acquire a Modulation and Coding Scheme (MCS) level or a number of multiple layers based on the number of physical resource blocks being included in the allocation information, and
    to determine a Transport Block Size (TBS) based on the spreading factor.

11. The user equipment of claim 10, wherein the number of physical resource blocks and the spreading factor are tied to one another and pre-defined in a table,
    wherein the number of physical resource blocks and the MCS level are tied to one another and pre-defined in a table, and
    wherein the number of physical resource blocks and the number of multiple layers are tied to one another and pre-defined in a table.

12. The user equipment of claim 11, wherein the spreading factor and the NoMA codebook set, or the MCS level and the NoMA codebook set, or the number of multiple layers and the NoMA codebook set are tied to one another and predefined in a table, and
    wherein the spreading factor and the TBS, or the MCS level and the TBS, or the number of multiple layers and the TBS are tied to one another and predefined in a table.

13. The user equipment of claim 12, wherein, in case a plurality of NoMA codebook sets are tied to the spreading factor or the MCS level or the number of multiple layers, the processor is configured to further receive indication information including one NoMA codebook set among the plurality of NoMA codebook sets being tied to the spreading factor or the MCS level or the number of multiple layers.

* * * * *

UNITED STATES PATENT AND TRADEMARK OFFICE
CERTIFICATE OF CORRECTION

PATENT NO. : 11,032,033 B2
APPLICATION NO. : 16/611705
DATED : June 8, 2021
INVENTOR(S) : Hojae Lee Page 1 of 1

It is certified that error appears in the above-identified patent and that said Letters Patent is hereby corrected as shown below:

On the Title Page

Item [60] delete "Provisional application No. 62/521,538 filed on Sep. 19, 2017" and insert --Provisional application No. 62/521,538 filed on June 19, 2017--.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*